US008281492B1

(12) United States Patent
Toth

(10) Patent No.: US 8,281,492 B1
(45) Date of Patent: Oct. 9, 2012

(54) TUBE CUTTER

(76) Inventor: Donald R. Toth, Olmsted Falls, OH (US)

(*) Notice: Subject to any disclaimer, the term of this patent is extended or adjusted under 35 U.S.C. 154(b) by 329 days.

(21) Appl. No.: 12/360,196

(22) Filed: Jan. 27, 2009

(51) Int. Cl.
*B26B 17/00* (2006.01)
*B23D 21/06* (2006.01)

(52) U.S. Cl. .................................. 30/95; 30/92; 30/179

(58) Field of Classification Search ............. 30/95, 232, 30/341, 254, 186, 191, 193, 346.53, 346.55, 30/346.61, 92, 179, 258, 188, 250, 252; D8/52, D8/107, 51, 4, 5
See application file for complete search history.

(56) References Cited

U.S. PATENT DOCUMENTS 1,843,819 A * 2/1932 Jackson .......................... 81/416
2,965,967 A * 12/1960 Wahl .............................. 30/341
3,257,874 A * 6/1966 Madeira .......................... 81/9.3
D260,726 S * 9/1981 Ishii ................................ D8/57
4,434,555 A * 3/1984 Stoll ................................ 30/92
4,899,445 A * 2/1990 Erbrick et al. .................. 30/251
5,301,431 A * 4/1994 Cera .............................. 30/254
5,528,834 A * 6/1996 Seber et al. ..................... 30/340
5,581,897 A * 12/1996 Liebscher ....................... 30/416
D395,217 S * 6/1998 Start ................................ D8/52
5,987,750 A * 11/1999 Tally ................................ 30/92
6,289,773 B1 * 9/2001 Patry et al. ...................... 81/185
2005/0172500 A1 * 8/2005 Yeh ................................ 30/271
2008/0028621 A1 * 2/2008 Hasegawa ....................... 30/232

OTHER PUBLICATIONS

Universal Grinding Corporation, Tube Cutter flyer(s).

* cited by examiner

*Primary Examiner* — Ghassem Alie

(57) ABSTRACT

A tube cutter having first and second arms pivotally connected. Each arm includes a handle segment and a head portion. The head portion of one arm includes a v-block and the head portion of the other arm has a cutting portion. At least each handle portion has a black oxide coating or chrome plating. A second tube cutter may include a pair of bumpers, one on each handle and each of the bumpers may include a gusset connecting the bumper to the terminal end of the handle.

8 Claims, 2 Drawing Sheets

TUBE CUTTER

BACKGROUND

1. Technical Field

The disclosure relates to the general field of cutting apparatuses and in particular to hand held apparatuses for cutting tubes, cords, hoses, or the like.

2. Background Art

In the past many items have been used to cut items such as tubes, cords, hoses, or the like. One common instrument to cut such items includes a standard utility knife; also know as a box knife. Such instruments are useful for cutting many things; however, it is difficult to cut the above items with a utility knife.

In the past scissors have often been used to cut such items. The scissors range from standard general scissors to specially designed scissors. But using scissors to cut the above items is also challenging for numerous reasons.

Furthermore, various others have tried to develop an easy to use and reliable tube cutter. However, these attempts have several drawbacks, inability to cut the tube square, inability to sufficiently hold the tube, the weight of the instrument, inability of the instrument to supply a sufficient amount of force, prior instruments easily jam, and/or the instrument is prone to breakage.

BRIEF DESCRIPTION

An embodiment disclosed herein includes a tube cutter. The cutter includes a first arm and a second arm pivotally connected. Each arm includes a handle segment and a head portion, the head portion of one arm includes a v-block and the head portion of the other arm includes a cutting portion. At least each handle segment has either a black oxide coating or chrome plating.

A second embodiment disclosed herein includes a tube cutter also having a first arm and a second arm pivotally connected. Each arm includes a handle segment and a head portion, the head portion of one arm includes a v-block and the head portion of the other arm includes a cutting portion. Each handle further includes a bumper and a gusset connecting a base of each bumper to a terminal end of each handle segment.

Further advantages of the disclosed embodiments will be readily apparent to those skilled in the art upon a reading of the following disclosure when taken in conjunction with the accompanying drawings.

DETAILED DESCRIPTION

Figure 1:
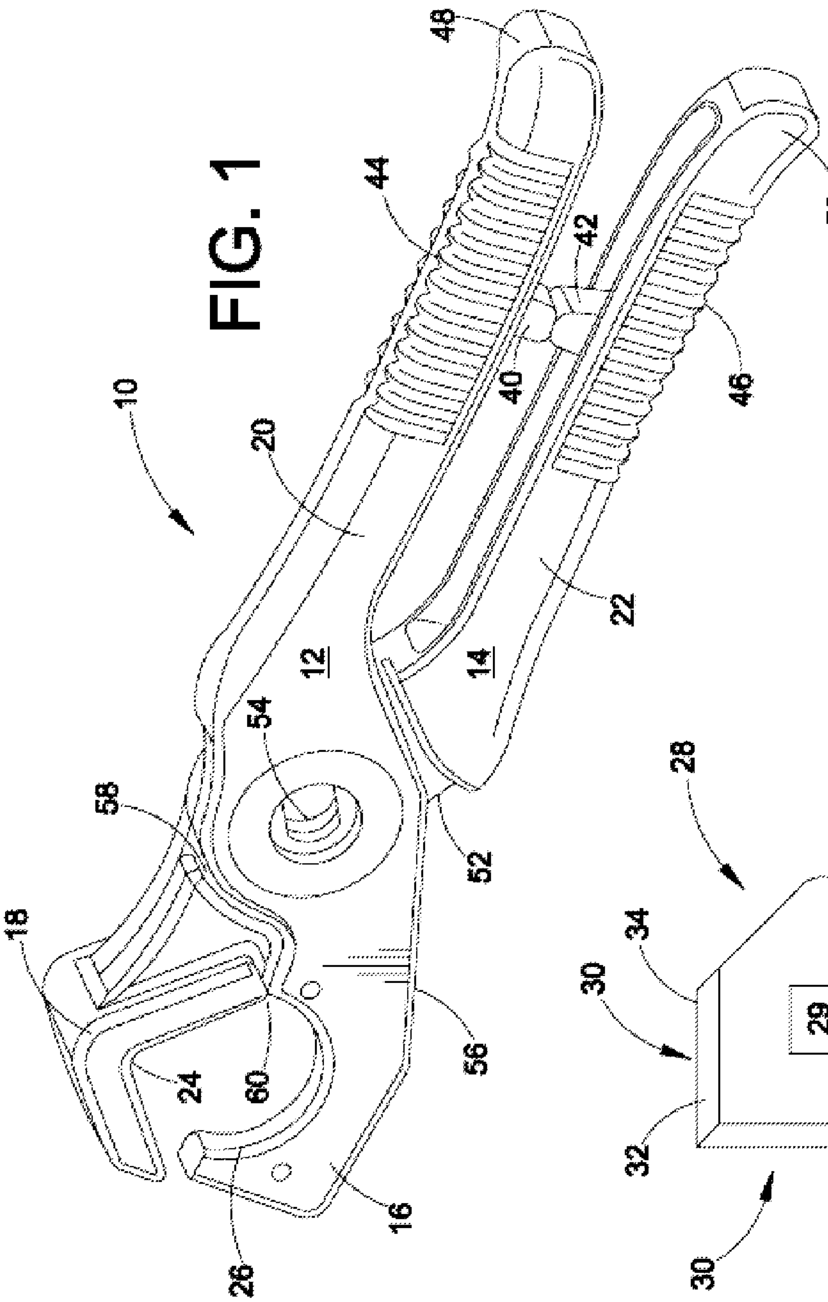
FIG. 1 is a perspective view of a tube cutter.

Depicted in FIG. 1 is a tube cutter 10. Cutter 10, as shown, includes a first arm 12 pivotally connected to a second arm 14. Each arm 12, 14 include a head portion 16, 18, and a handle segment 20, 22. Head portion 18 includes a v-block and head portion 16 includes a cutting portion 26. In one embodiment, at least each handle segment 20, 22 of cutter 10 include either a black oxide coating or chrome plating. Alternatively both of the handle segments 20, 22 and/or the head portions 16, 18 may include the black oxide coating or chrome plating.

Figure 2:
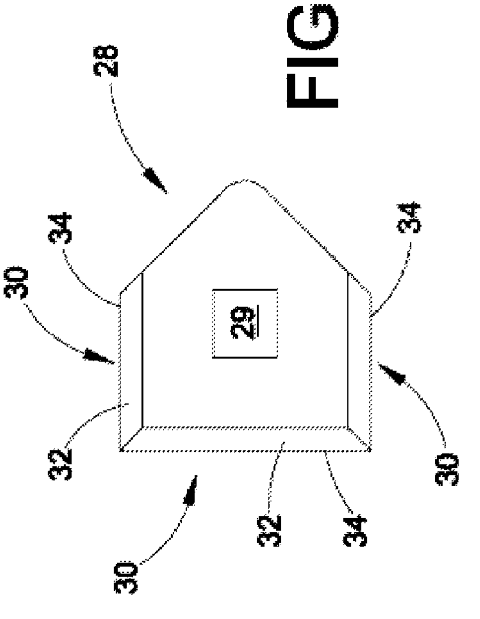
FIG. 2 is a side view of a blade for the cutter.
Figure 3:
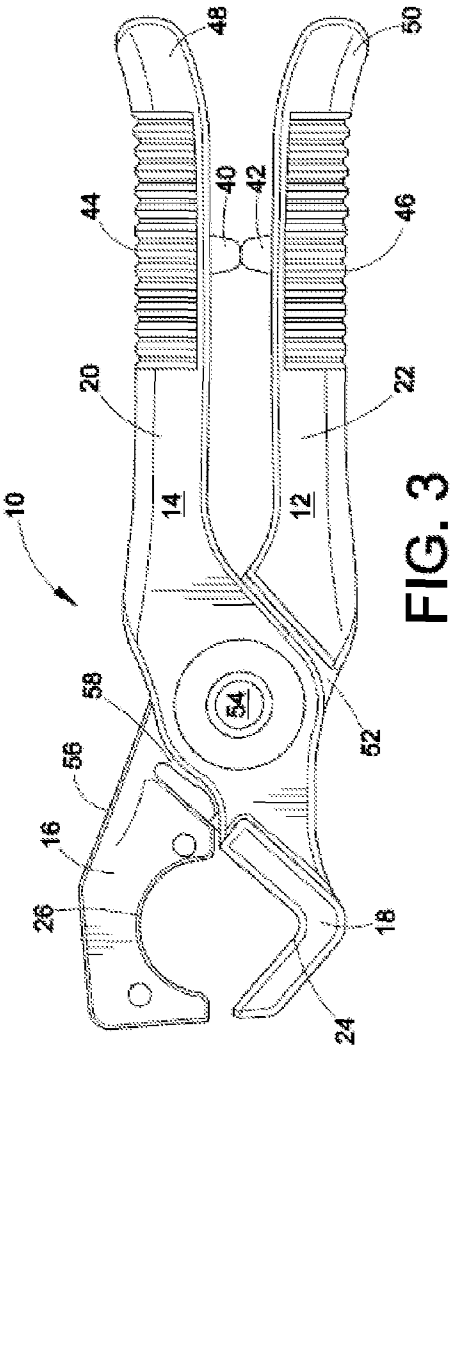
FIG. 3 is a side view of the tube cutter shown in the aforementioned figures.

In a further embodiment, head section 26 includes a blade 28 (shown in FIG. 2) secured to head 16. Blade 28 may be secured by any technique, such as but not limited to screws, rivets, etc. Preferably blade 28 is secured in a removable, preferably non-destructible, fashion. Non-destructible means at least such removal does not materially damage either of blade 28 or cutter 10. Blade 10 preferably includes at least three (3) cutting edges, of which two would be in use at any one time. In a particular embodiment, blade 28 includes an internal opening 29 (shown in FIG. 2).

In a certain embodiment, the cutting edges 30 are double honed. The edge closest to head 16 may be referred to as the grind surface 32 and the edge closest to the outer edge of blade 28 may be referred to as the hone surface 34. The grind surface is preferably at an angle from anywhere from about 40° to 10°. Specific examples include 40°, 30°, 20°, and 10°. The hone surface may also be on an angle, which my range from 50° to 10°. Examples of suitable angles include 50°, 40°, 30°, 20°, and 10°. The grind and hone surfaces 32 and 34 are not limited to the above examples. Furthermore, the grind and hone surfaces 32 and 34 may be practiced in any combination thereof.

Figure 4:
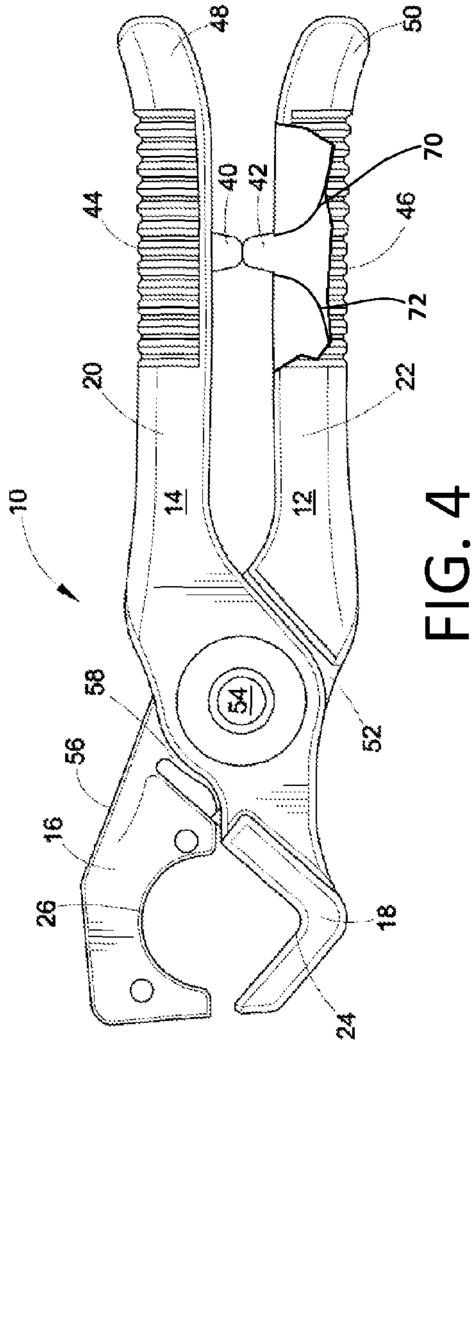
FIG. 4 is a side view of a bumper and a gusset as disclosed in a particular embodiment.

Furthermore, each handle 20 and 22, may include a bumper 40, 42. Preferably, bumpers 40 and 42 are aligned such that bumpers 40 and 42 contact upon the closing of handles 20 and 22, also known as handles 20 and 22 being in a juxtaposed position. It is further preferred that bumpers 40 and 42 come in contact in a manner to prohibit handles 20 and 22 coming in contact upon closing handles 20 and 22. As shown in FIG. 4, each bumper 40 and 42 may terminate into a gusset 70 towards the respective terminal end of the handle segment. Optionally, gussets 72 may also be used on the non-terminal side of each bumper 40 and 42.

Each handle may also include a ribbed section 44 and 46 as shown. In one embodiment, ribbed sections 44 and 46 are approximately centered across the width of handle 20 and 22 from the respective bumper 40 or 42. Preferably, ribbed section 44 and 46 do not extend to a terminal end 48 and 50 of the respective handle 20 and 22. Ribs 44 and 46 may be cast into handles 20 and 22. In one particular embodiment, each ribbed section 44 and 46 is disposed along less than 50% of the length of each handle segment 20 and 22.

In another embodiment, handles 12 and 14 are substantially concave. Also, as shown, one or both handles 20 and 22 may have an opening 52 between a raised portion of the handle and the pivot point 54 for cutter 10.

Handles 20 and 22 preferably also have a length of no more than about six (6") inches, more preferably less than about five (5") inches, and even more preferably no more than about four and a half (4½") inches.

With respect to head portion 16, it includes a reinforced segment 56 extending from about pivot point 54 toward a terminal end of head portion 16 on the external surface of cutter 10. Preferably reinforced segment 56 does not include a radius on the periphery of cutter 10, more preferably reinforced segment 56 includes a straight line segment as shown.

Additionally, it also preferred that each head portion includes a radius extending from pivot point 54 toward an interior opening 60 of the head portions 16 and 18. The radius should be sized on each head portion 16 and 18 to form an opening 58 between the respective head portions 16 and 18.

It is preferred that cutter 10 weighs no more than about 16 ounces, preferably no more than about 14 ounces, more preferably less than about 13 ounces.

Advantage of cutter 10 include, at least, that it is easier for a user to make straight and clean cuts on each on every use. It also reduces the time a user will need to cut tubes, hoses, cords, and other items having a thickness as compared to conventional cutters. Proper use of cutter 10 eliminates angled cuts. Cutter 10 may be used to cut items with an outer diameter of at least about 1" and it may also be used to cut items with an outer diameter of as small as about ¼". Examples of material which may be used to cut with cutter 10 include Kevlar, rubber, plastic, braided fiberglass, PVC, polyurethane jackets, as well as coaxial cable.

Thus it is seen that the apparatus and methods of the present disclosure readily achieve the ends and advantages mentioned as well as those inherent therein. While certain preferred embodiments herein heave been illustrated and described for the purposes of the present disclosure, numerous changes in the construction and arrangements of the parts and steps may be made by those skilled in the art which changes are encompassed with the scope and spirit of the present claims.

What is claimed is:

1. A tube cutter comprising a first and a second arm pivotally connected, wherein each arm includes a handle segment and a head portion, the head portion of one arm including a v-block and the head portion of the other arm having a cutting portion, first and second bumpers, the first bumper disposed on one of the handle segments and the second bumper disposed on the other handle segment, the bumpers aligned to contact upon the handle segments in a juxtaposed position, each handle segment includes a cavity, the first bumper located in the cavity in one of the handle segments and the second bumper located in the cavity in the other handle segment, the first bumper having a first radius where one side of the first bumper contacts the handle segment in the cavity and a second radius where the other side of the first bumper contacts a top surface of the second bumper, the second bumper having a first radius where one side of the second bumper contacts the handle segment in the cavity and a second radius where the other side of the second bumper contacts a top surface of the first bumper, wherein the first radius of the first and second bumpers is greater than the second radius of the first and second bumpers, and a blade having three double horned cutting edges, the blade attached to the cutting portion of the head.

2. The cutter of claim 1 wherein each handle portion includes a black oxide coating.

3. The cutter of claim 1 wherein each handle segment includes a first and a second side and further including a space between one of the sides of each handle segments and a location which the two arms pivotally connect.

4. The cutter of claim 1 wherein the head having the cutting portion includes a non-radius portion extending from a pivot point between the two arms along an exterior surface of the head.

5. The cutter of claim 1 wherein the head having the cutting portion includes a linear portion extending from a pivot point between the two arms along an exterior surface of the head.

6. The cutter of claim 1 further including a rib sectioned along less than about 50% of an exterior surface of each handle segment.

7. The cutter of claim 1 wherein the head having the cutting portion further includes a radius opposed to an inner end of the v-block of the other head.

8. A tube cutter comprising a first and a second arm pivotally connected, wherein each arm includes a handle segment and a head portion, the head portion of one arm including a v-block and the head portion of the other arm having a cutting portion, first and second bumpers, the first bumper disposed on one of the handle segments and the second bumper disposed on the other handle segment, the bumpers aligned to contact upon the handle segments in a juxtaposed position, each handle segment includes a cavity, the first bumper located in the cavity in one of the handle segments and the second bumper located in the cavity in the other handle segment, the first bumper having a first radius where one surface of the first bumper contacts the handle segment in the cavity and a second radius where the other surface of the first bumper contacts a top surface of the second bumper, the second bumper having a first radius where one surface of the second bumper contacts the handle segment in the cavity and a second radius where the other surface of the second bumper contacts a top surface of the first bumper, wherein the first radius of the first and second bumpers is greater than the second radius of the first and second bumpers, and a blade having three double horned cutting edges, the blade attached to the cutting portion of the head.

* * * * *